Jan. 3, 1961 J. F. SULLIVAN ET AL 2,967,278
INDUCTIVE TYPE SENSING AND CONTROL SYSTEM
Filed Sept. 30, 1957 2 Sheets-Sheet 1

INVENTORS
James F. Sullivan
Vincent J. Ligue
BY Peck & Peck
ATTORNEYS

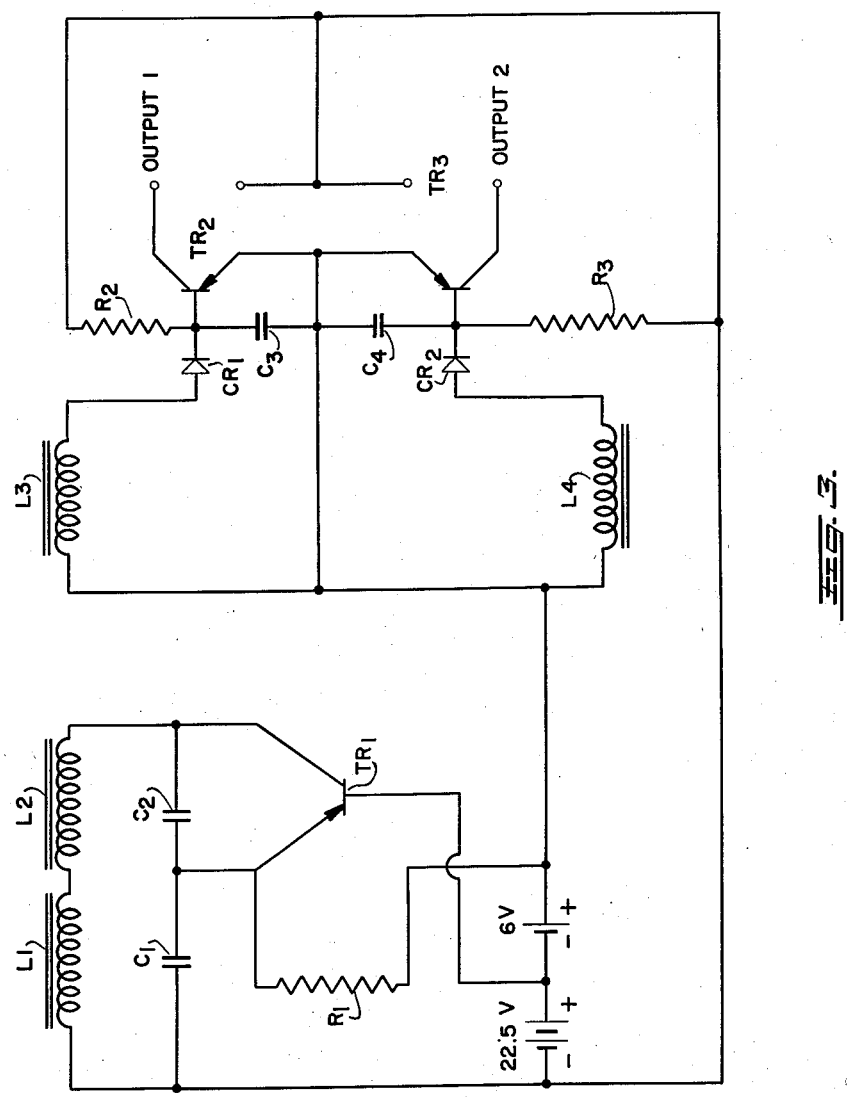

United States Patent Office 2,967,278
Patented Jan. 3, 1961

2,967,278

INDUCTIVE TYPE SENSING AND CONTROL SYSTEM

James F. Sullivan and Vincent J. Lique, Danbury, Conn., assignors to International Instruments, Incorporated, New Haven, Conn., a corporation of Connecticut Filed Sept. 30, 1957, Ser. No. 687,151

3 Claims. (Cl. 331—65)

This invention relates broadly to the art of inductive sensing and control systems and in its more specific aspects it relates to a novel and unique apparatus and system of this character which replaces and overcomes the problems inherent in the prior art contact type sensitive moving element relay, conventionally called a meter relay; and the nature and objects of the invention will be readily recognized and understood by those skilled in the arts to which it relates in the light of the following explanation and detailed description of the accompanying drawings illustrating what we at present believe to be preferred embodiments or mechanical expressions of our invention from among various other forms, arrangements, combinations and constructions, of which the invention is capable within the spirit and scope thereof.

This invention has been designed for application to indicating devices or meters for control and actuation thereby to, for instance, turn a device on when the meter has reached a predetermined reading and to turn it off when the meter has reached some other predetermined reading or level.

In devising this highly advantageous and efficient apparatus and electrical system we have provided a magnetic coupling and means operable by and under control of the conventional meter needle to disturb, upset or vary this inductive coupling to produce a change in the induced electrical energy which is utilized as a signal to actuate any type of electronic gear or relay equipment.

In systems of this character it is essential that they operate accurately and efficiently and not be affected by other electrical influences. Since many meters or indicating devices with which our apparatus may be combined and by which it is controlled depend for their operation upon either a permanent or electric magnet as an operative element thereof, it has been a prerequisite of our system that it is endowed with characteristics to permit its use and accurate functioning in the presence of other magnetic fields.

It is therefore one of our major purposes to provide an inductive type sensing and control system which will operate successfully in the presence of other magnetic fields.

In carrying out the concept of our invention we utilize mutually coupled coils, with a known electrical energy applied to one coil which in turn induces a comparable electrical energy in the other coil. We provide an actuator controlled by the meter needle which actuator is so mounted and arranged that it passes between the coils and through the magnetic path of the coils to thereby vary the inductive coupling to create a signal for actuating the aforementioned various types of electronic gear or relay equipment.

We have resolved the problem of extraneous magnetic fields on the operation of our apparatus by using a non-magnetic actuating element as the means for upsetting, disturbing or varying the inductive coupling between the coils.

It has been necessary in the development of our apparatus to consider the weight of the actuator and to ensure that increase of torque is not sufficiently substantial to cause inaccuracies of instrument readings. These problems of weight and torque are important since the actuator is mounted on and movable with the meter needle and it is essential that the weight which is to be moved thereby is kept at a minimum.

We have found that the use of an actuator formed of a non-magnetic light weight metal produces the desired and highly advantageous results required of our apparatus. As an example, aluminum may be successfully used to form the actuator which is adapted to be moved through the magnetic field between the coils.

It is thus a further object of our invention to provide an inductive sensing and control system which permits positioning indications of the meter needle or the indicating medium of the meter or any type of measuring device to control large amounts of power without reflecting an undesired loading on the needle.

Relatively simple and unusually efficient electrical means are provided for putting into use the effect of the variance of the inductive coupling between the coils and we have so arranged our circuit that the maximum output of the apparatus occurs when the actuator is exactly centered in the gap between the actuator coil and the pick up coil. This ensures full and complete accuracy of operation of the apparatus.

It has also been one of our purposes to eliminate the necessity for expensive or cumbersome equipment between the output of the unit and the relay which is used to control relatively large amounts of power for controlling various types of devices.

One prior art or method employed in the contact type sensitive moving element relay is usually a D'Arsonval movement. It is comprised of a moving armature, signal coil, lock coil, permanent magnet, fixed contact and a moving contact. Usually in contact type sensitive moving element relays, a current is passed through a coil suspended on jewel pivots in the field of a permanent magnet. Restrained by some force, usually hair-springs, the coil moves to various positions relative to the implied signal current passing through its signal coil. Because of the addition of the lock coil, when the contacts come together, there is enough current flow through the locking coil as the circuit is closed to produce a further D'Arsonval effect or additional torque to the armature to build up contact pressure until the full current flows through the contacts. It should be noted here that this contact type does not drop out as conventional relays do, but the lock coil circuit must be interrupted and the load spring of the movable contact is the drop out force for opening the contacts. Another disadvantage, if the sensitive moving element relay is an indicating type meter relay, the movement is restricted to the area between upper and lower stationary contacts, not allowing a full scale indication of the applied signal.

According to the arrangement of the present inductive type sensitive moving element relay, the contacts and lock coil or magnet of the contact type moving element relay are eliminated, and in their place are two (2) mutually coupled coils whose coupling is varied by an actuator, located on the moving element arm passing between or through the magnetic path of the coils.

It is also an object of our invention to provide a meter embodying our apparatus operatively combined therewith which is arranged for unusual visibility of the indicators both for reading the indications and for facilitating the setting thereof for operation at certain levels.

A further object of our arrangement is to provide excellent accessibility of the setting levers and to so mount and arrange such levers that the actuation thereof in a setting operation is greatly facilitated.

While our apparatus and system has been particularly devised for use with indicating meters and the like it is equally useful as a measuring device for measuring the thickness of a metal passing between the poles of the sensing coils.

The apparatus and system of our invention may also be used for measuring the thickness of materials other than metals. The spacing between the sensing coils as determined by the thickness of the material being measured causing an output, the magnitude of which is proportioned to the distance between the sensing coils.

It has also been one of our objects to provide a means for determining the relative permeability of magnetic metals. The output of the apparatus being a direct indication of the permeability of materials passing between the poles of the sensing coils.

In devising our inductive type sensing and control system to produce unusually accurate and satisfactory results under varying conditions we have not sacrificed simplicity of design, construction and operation nor have we sacrificed economy in production. The apparatus has also been designed with a view to rendering long and trouble free operation.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

Fig. 3 illustrates the oscillator and amplifier circuits which are used in our inductive type sensing and control apparatus.

Figure 1:
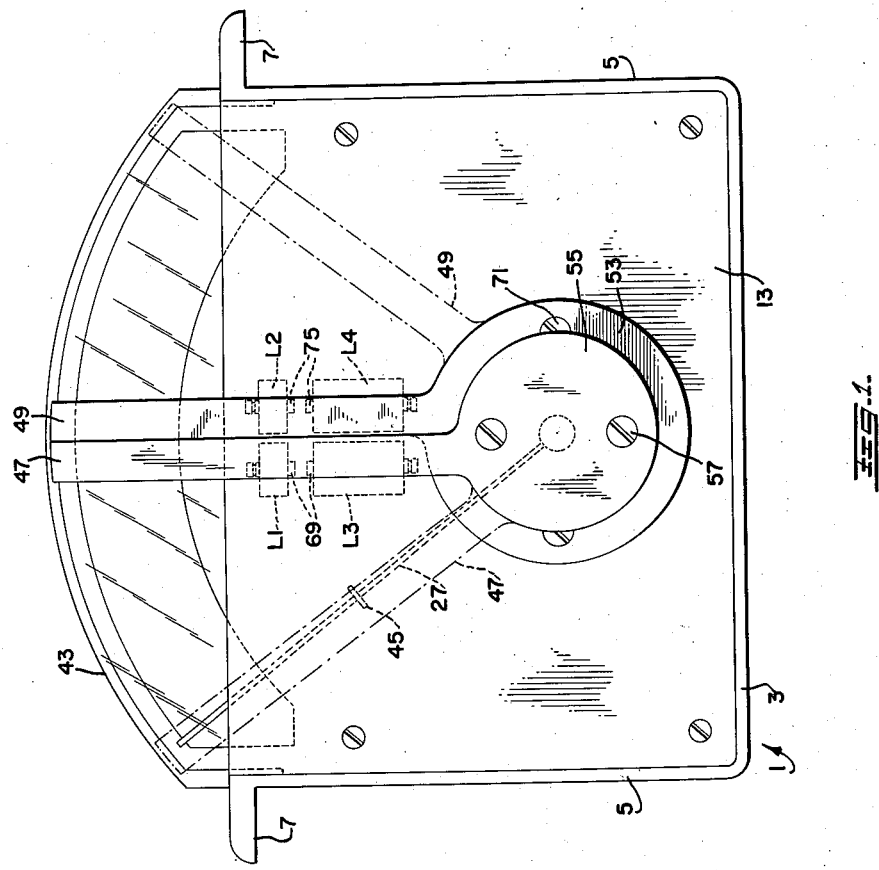
Fig. 1 is a view in front elevation of the indicating meter having the inductive sensing and control system of this invention combined therewith.
Figure 2:
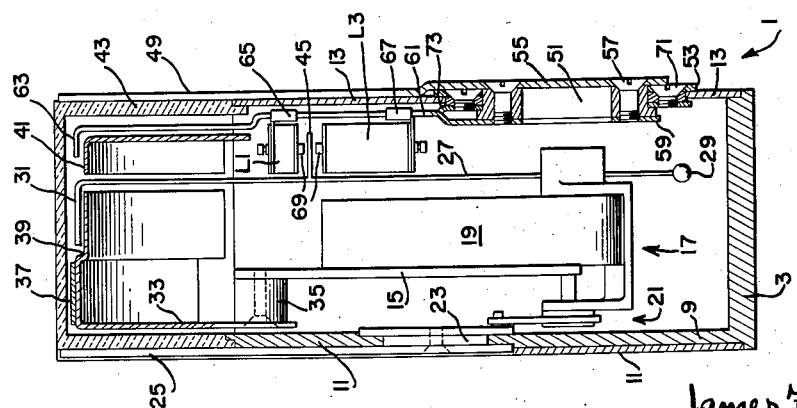
Fig. 2 is a vertical sectional view of the apparatus illustrated in Fig. 1.

In the accompanying drawings and particularly Figs. 1 and 2 thereof we have used the numeral 1 to designate in its entirety an indicating meter with which our apparatus has been combined for operation and control thereby to turn a device on and to turn it off when the meter has reached predetermined levels or to control a variety of operations.

While the meter and its housing may be of any type, as one example from among many, we have disclosed the meter as involving a casing having a bottom wall 3, vertical end walls 5 which may be formed at their upper ends with outwardly directed mounting flanges 7. At the rear the casing may be provided with an upwardly extending wall 9 and a bottom cover plate 11 removably fixed thereto. The casing is provided with a removable front cover plate 13. While it is to be understood that the casing for the meter and our sensing and control system may be of any suitable form and arrangement other than that described it is adapted to mount and house the metering mechanism and the sensing and control mechanism and the electrical unit which is operatively associated therewith.

A base plate 15 is mounted within the casing and fixed to the bottom cover plate or to any other stationary part of the casing and mounts the conventional operating mechanism of any meter which may be of the type which depends upon either a permanent or electric magnet as an element necessary for its operation. We have designated such operating and control mechanism in its entirety by the numeral 17 and since it is generally conventional we shall not describe it in detail. It does however include a meter magnet 19 which produces a magnetic field, which as we have explained above, does not adversely affect the operation of our apparatus. The meter disclosed is generally of the D'Arsonval type and may include setting linkage designated generally by the numeral 21 which is operatively connected through an aperture 23 in plate 11 with a meter zero adjust arm 25 for manual operation exteriorly of the casing. The indicating meter includes a meter needle 27 which extends vertically within the casing and is operatively mounted with the meter mechanism in the usual and conventional manner. A usual counterweight 29 is provided on the lower end of the meter needle while at its upper end it is formed to provide a laterally and rearwardly extending pointer 31. A stepped scale support 33 is mounted and supported from the backing plate as at 35, the scale including an uppermost curved meter scale 37, a curved step 39 over which pointer 31 swings and a curved level set scale 41, the latter being mounted in any suitable manner to the casing or at its ends to the scale support or step 30. We provide a transparent housing top 43 formed of any suitable material which extends over the scale steps and the top of the housing and being transparent causes the various needles and scales to be visible from the exterior of the casing. The housing top is curved to conform to the curvature of the steps and each end may be removably mounted on and removably fixed to the flanges 7 of the casing.

At a point along the vertical length of the meter needle 27 we provide a laterally and forwardly extending actuator or actuating vane 45 which is formed of a lightweight nonmagnetic material such as aluminum. It is to be understood that the vane 45 may be made of other light weight non-magnetic materials than aluminum and still fall within the spirit and scope of our invention and the vane may be formed integral with the needle or may be a separate element affixed thereto in any appropriate manner.

The casing may be provided with any suitable terminals for connection to batteries or voltage supply and these outlet terminals may be positioned as desired.

We provide an adjustor set lever 47 for the high side and an adjust or set lever 49 for the low side, each of these levers being on the exterior of the casing and being manually operable and the upper ends thereof preferably being positioned adjacent the top of the casing top 43. The front wall 13 of the casing is provided with a circular aperture 51 therein and the low range lever 49 has an annular base 53 which rotatably fits within the aperture. The high range lever 47 is formed with a disc base 55 of greater diameter than that of the opening formed by the annulus 53 so that upon swinging lever 47 to any point from its minimum position to its maximum position (shown in dotted lines in Fig. 1) its base 55 will rotate on and relative to annulus 53. The disc 50 of the high range adjust lever 47 is fixed as by screws 57 with the base 59 of what we shall term the "high range coil arm" 61. The high range coil arm extends substantially vertically upwardly and is provided on its upper end with a laterally rearwardly extending indicator pointer 63 which extends over level set scale 41 as is clearly apparent in Fig. 2 of the drawings. A tank or exciting coil L1 is fixed in any suitable manner as at 65 to arm 61 and a pick up coil L3 is fixed to arm 61 as at 67 in spaced relation to the exciter coil with the poles 69 of the set of coils being oppositely disposed and spacedly arranged. It will now be appreciated that the exciter coil L1 is mounted on the same axis as the amplifier pick up coil L3 and that this axis of mounting is perpendicular to the axis of the vane 45 and that the coils L1 and L3 are mounted in such positions relative to the vane that as it travels back and forth with the meter needle 27 it will pass between the poles 69 of said coils.

The annulus 53 which forms the base of the low range adjust arm 49 is fixed by screws 71 or the like to the low range coil arm 73 which is of the same construction as the coil arm 61 already described. The coil arm 73 mounts a tank or exciter coil L2 and an amplifier or pick up coil L4. The coils L2 and L4 are mounted in the same manner and in the same relative positions as coils L1 and L3 and are adapted to have the vane 45 pass between the poles 75 thereof. The arm 73 has an indicating pointer exactly the same as pointer 63 for play over the scale 41. Thus the construction and operation of arms 61 and 73 are the same as is the mounting of coils L1, L2, L3, and L4.

When it is desired to set the meter to cause a device to be turned on when a predetermined level has been reached and to turn off when another level has been reached it is only necessary to swing levers 47 and 49 until the pointers 63 are at the desired points on the scale 41. This lever movement will of course move the coils so that when the meter reaches the predetermined level the vane will be between a set of coils to cause a certain action and when the meter needle reaches a further level the vane will pass between the other set of coils to cause a further operation to take place.

A colpitts type oscillator is used to supply a frequency of approximately 65,000 cycles. This circuit consists of a transistor TR1, resistor R1, condensers C1 and C2, tank circuit coils L1 and L2. Power to operate the oscillator is supplied by a 22½ volt battery and a 6 volt battery connected in series. This source of power is also used to operate the amplifiers.

As is apparent we use two amplifiers in our system which permits a lower and upper limit to be set on the meter. An application for this arrangement is to turn a device on when the meter has reached a predetermined reading, and to turn it off when the meter has reached some other predetermined level.

When the circuits are placed in operation, the oscillator will furnish power to the tank coils L1 and L2. These coils being magnetically coupled to their respective pick up coils will induce a voltage in the pick up coils L3 and L4.

The voltage from pick up coil L3 is fed through a diode CR1. The diode is simply a rectifier and permits the passage of only the positive portions of the voltage fed to it by L3 to pass through to condenser C3. The condenser charges to a positive value sufficient to exceed the negative potential which would otherwise be present at this point due to R2. This positive potential is also applied to the base of transistor TR2 causing the transistor to swing to its non-conducting or minimum conducting state depending on the magnitude of positive charge being applied to its base. The current in the collector circuit designated as output 1 would be a minimum, when the base is biased as outlined above.

Upon the positioning of the metal actuating vane 45 between coils L1 and L3, the magnetic coupling is disturbed in such a manner as to reduce the voltage induced in coil L3 by the tank coil L1 which is coupled to it. This lowering or reduction in the voltage obtainable from coil L3 results in a lowering of the positive charge on condenser C3 to a point below the negative potentional being introduced by R2. This changes the bias on the transistor TR2 base from a positive charge to a negative charge, thereby causing the transistor TR2 to swing from a non or minimum conducting state to a conducting state so that current flow in the output circuit will be increased from a minimum to a maximum. The degree of increase of course being determined by the reduction in voltage from pick-up coil L3, so that when the actuating vane is exacly centered in the gap or space between the tank coil L1 and pick-up coil L3, the maximum increase in output will occur. This resultant change of output from a minimum to a maximum as a vane is passed between the two coils, is utilized to actuate a relay which in turn controls much larger amounts of power.

As one example the value of the components in Fig. 3 may be:

| | |
|---|---|
| C1 | .02 mfd. 100 v. |
| C2 | .002 mfd. 100 v. |
| L1—L2 | 600 T 40 wire. |
| L3—L4 | 5000 T 45 wire. |
| TR1—TR2—TR3 | CK 722 transistor. |
| CR1—CR2 | IN34 diode. |
| R1 | 2000 ohms—⅓ w. |
| R2—R3 | 300 K—⅓ w. |
| C3—C4 | .001 mfd. 50 v. |

It is to be understood that our sensing and control system is not limited to operation at the values stated herein, and that other frequencies of power and greater or lesser voltages and currents may be employed as required. The basic concept, however, will apply, irrespective of frequency, voltage or currents employed.

We claim:

1. An inductive sensing apparatus, including an oscillator circuit and an amplifier circuit, said two circuits being electrically independent, an output circuit connected to said amplifier circuit, and an exciter coil connected to and supplied current by said oscillator circuit, a pick up coil connected to said amplifier circuit, said coils being magnetically coupled together, means positionable between said coils for varying said magnetic field coupling the coils decreasing the induced electrical energy between the coils, and further means in said amplifier circuit operable when the induced electrical energy between the coils is decreased to cause maximum flow of current in said output circuit, and the frequency of said oscillator circuit remaining constant when a change occurs in the induced electrical energy between said coils.

2. An inductive sensing apparatus, including an oscillator circuit and an amplifier circuit, said two circuits being electrically independent, an output circuit connected to said amplifier circuit, an exciter coil connected to and supplied current by said oscillator circuit, and a pickup coil connected to said amplifier circuit, said coils being magnetically coupled together, said amplifier circuit including means feeding the signal impressed on the pickup coil as a positive potential, and further means controlling the flow of current to said output circuit and connected to said means and in non-conducting position when a positive potential is impressed thereon, biasing means supplying a negative potential to said further means bucking said positive potential to provide a minimum flow of current to said output circuit when the value of said positive potential is greater than the value of said negative potential, and means positionable between said coils to decrease the said positive potential to place said further means in conducting position for maximum flow of current in said output circuit.

3. An inductive sensing apparatus, including an oscillator circuit and an amplifier circuit, said two circuits being electrically independent, an output circuit connected to said amplifier circuit, an exciter coil connected to and supplied current by said oscillator circuit, a pickup coil connected to said amplifier circuit, said coils being magnetically coupled together and said amplifier circuit including a rectifier connected to said pickup coil, and feeding the signal impressed on said pickup coil as a positive potential, means connected to said rectifier and receiving said positive potential and being charged thereby to a positive potential, biasing means in said circuit and connected to said means and feeding a negative potential thereto, the value of the positive potential with which said means is charged normally exceeding the value of the negative potential fed thereto, a current flow controlling means in said amplifier circuit and connected to said means and controlling the flow of current in said output circuit, said current flow controlling means being biased to non-conducting position by said positive potential to provide a minimum flow of current in said output circuit, and means positionable between said coils to reduce the voltage induced in said pickup coil to thereby reduce the value of the positive charge in said means below the value of the negative potential being fed thereto by said biasing means, whereby said current controlling means is biased to conductive position for maximum current flow in said output circuit.

References Cited in the file of this patent

UNITED STATES PATENTS

| | | |
|---|---|---|
| 1,940,769 | Potter | Dec. 26, 1933 |
| 2,234,184 | MacLaren | Mar. 11, 1941 |
| 2,411,247 | Cohen | Nov. 19, 1946 |
| 2,468,138 | Terry | Apr. 26, 1949 |
| 2,540,728 | Hansen et al. | Feb. 6, 1951 |
| 2,761,064 | Solecki | Aug. 28, 1956 |

OTHER REFERENCES

Proc. I.R.E. Australia, November 1955, pp. 401, 402 "A Very Sensitive Meter Relay," Swift.